UNITED STATES PATENT OFFICE.

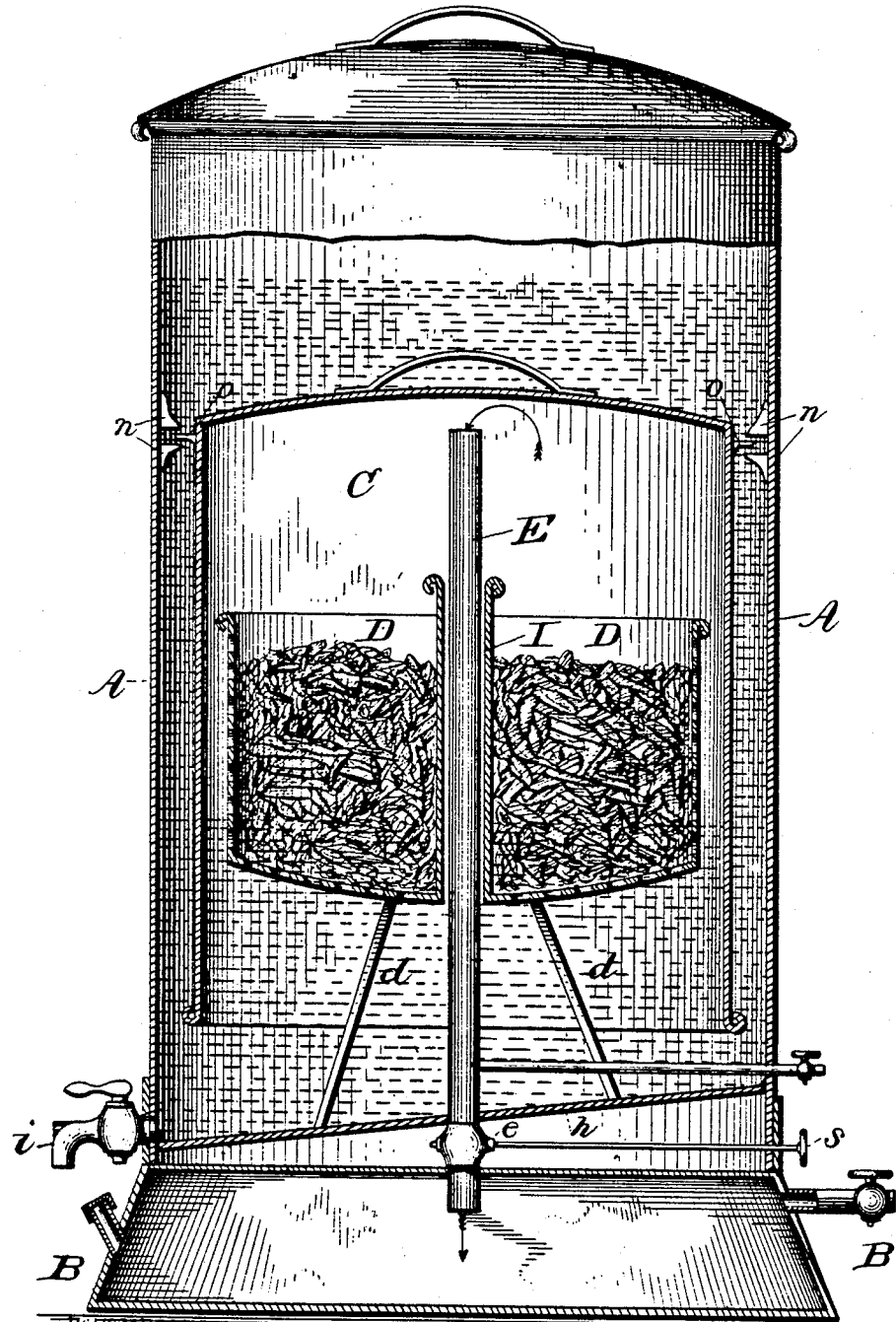

BYRON SLOPER, OF NEW YORK, N. Y.

PROCESS OF GENERATING HYDROGEN GAS.

SPECIFICATION forming part of Letters Patent No. 324,179, dated August 11, 1885.

Application filed April 11, 1885. (No model.)

*To all whom it may concern:*

Be it known that I, BYRON SLOPER, of New York, in the county of New York and State of New York, have invented certain new and useful Improvements in Process of Generating Hydrogen Gas; and I do hereby declare that the following is a full, clear, and exact description of the invention, which will enable others skilled in the art to which it appertains to make and use the same, reference being had to the accompanying drawing, and to the letters of reference marked thereon, which form part of this specification.

This invention relates to the generation of hydrogen gas by the action of dilute acid upon metallic turnings or other scrap, such as iron or zinc.

The object of the invention is to greatly increase the effectiveness of the acid solution in its action upon the metal, both as to the duration of its activity without renewal and as to the volume of gas generated in a stated time, and thereby cheapen the production of the gas and secure improved results in the continuous generation thereof without the frequent attention of a skilled operator heretofore required.

In the manufacture of hydrogen gas by the acid process as heretofore conducted much difficulty has been experienced in keeping up the generation of the required volume for more than a few hours, and in some cases for more than fifteen or twenty minutes, and it has been necessary to frequently draw off the spent acid-water from the generator and replace it by fresh acid-water in order to maintain the activity of the apparatus and secure the desired volume of gas, thus entailing a large expense for acid and labor, besides causing much annoyance due to the irregular action of the generator. After a fresh supply of acid-water the generation of gas would continue with decreasing activity for several hours, until gas was given off but very slowly. Then, if the generator was thrown out of use and allowed to rest for several hours, it could be started up with renewed activity with the same charge of acid-water, but would run down in a few minutes and almost entirely cease to give off gas. It has been the accepted theory that the acid was spent or weakened, and the so-called "spent acid-water" must be frequently drawn off and replenished by fresh acid-water in order to maintain the generation of the desired volume of gas. This theory and practice appear to have been erroneous. By practical experience I have discovered that the decreasing activity of the generator, its running down, and the rapid falling off in the volume of gas evolved were due to the diffusion and circulation through the acid-water of sulphate of iron or zinc, depending upon which metal was used, and other impurities, in fine particles, which interfered with the action of the acid upon the iron or zinc, and thus prevented the generation of gas. This decrease of activity in the generator occurs when the acid-water is shown by proper tests to be quite strong enough to do its full duty, except for the sulphates and impurities distributed in its body. This acid-water, filled with impurities, if allowed to settle, so that the sulphates were precipitated to the bottom of the generator, would again resume its former activity for a short time, until, by the evolution of gas, the acid-water was so agitated that the precipitate was stirred up and diffused through it, when the generation of gas would soon diminish and almost cease. So long as the sulphate of iron or zinc remained precipitated the acid-water remained sufficiently active.

I have discovered that by adding a small per cent. of an alkaline salt—such as carbonate of soda or carbonate of ammonia—to the acid-water in the generator the sulphates will be precipitated to the bottom of the generating-tank as fast as formed, and remain there, leaving the acid-water and the metal clear and free from impurities, and that the generation of gas will proceed with undiminished activity.

A charge of acid-water thus treated will last a long time without renewal and without attention of the operator, thus making the generation of pure hydrogen by the acid process practical and economical.

The generator for producing the gas is illustrated in the accompanying drawing, which represents a vertical section of a hydrogen-gas apparatus. The tank A, for containing acid-water and other parts of the generator, is mounted upon the base B, which contains the carburetor, of any desired construction, and such tank A is provided with an inclined bottom, *h*, and with a draw-off stop-cock, *i*, placed adjacent to the lowest portion of the inclined bottom, also with locking-lugs $n$, projecting from its inside near the top, to engage with similar lugs, $o$, on the bell C. This bell C is made sufficiently smaller than tank A to slide freely inside of it, and after being placed in the tank it is turned so that its lugs $o$ will engage with lugs $n$, and be thus held in position over the basket. The basket D, for containing the metal scrap, is perforated and provided with a central tube, I, and also with legs $d$ for supporting it in a suitable height above the bottom of the tank. The bell C extends a sufficient distance below the bottom of the basket to form a water-seal when the acid-water is forced down out of contact with such basket by non-use. The gas-eduction pipe E is open at its upper end and extends down through the tube I of the basket and through the inclined bottom of the tank into the carburetor below. It is provided with a valve, $e$, having a handle, $s$, extending beyond the outer wall of the tank. It may also have a branch pipe for conducting heating-gas without illuminants away to a holder or to burners without passing through the carburetor. The basket being supplied with metal scrap—as iron or zinc—and the parts adjusted, as shown, the acid-water is supplied to the tank in the usual way.

For the purpose of carrying out my invention there is added to the acid-water the alkaline carbonates, preferably in the proportio of two parts of carbonate of soda to one part of carbonate of ammonia. Either the carbonate of soda or carbonate of ammonia may be used alone, or some other alkaline carbonate may be used with advantageous results; but I prefer the mixture of carbonate of soda and carbonate of ammonia, the proportions of which may be varied. An ounce of carbonate of soda with half an ounce of carbonate of ammonia may be used for every gallon of acid-water, though a less quantity will produce good results, and I do not limit myself to any particular quantity of alkaline carbonate to be used. The alkaline carbonate acts upon the particles of sulphate of iron so as to cause them to be thrown down and deposited in such a form as to remain at the bottom of the generator below the basket of metal during the generation of gas. The acid-water, being freed from sulphate particles at the point of contact with metal, will act upon the iron to generate gas with nearly uniform energy for any desired period of time.

Having described my invention, what I claim, and desire to secure by Letters Patent, is—

1. The process of generating hydrogen gas by subjecting iron or zinc to the action of dilute acid and maintaining the activity of the acidulated water by adding thereto an alkaline carbonate, whereby one charge of acid-water may be used for a much longer time and the yield of gas may be more uniformly maintained.

2. The process of obtaining a uniform yield of hydrogen gas and economizing acid used in the generation, which consists in subjecting iron or zinc to the action of dilute acid containing in solution an alkaline carbonate for freeing the acid-water from floating or mixed particles of sulphate of iron or zinc.

3. In the manufacture of hydrogen gas, the method of maintaining the yield or volume of gas generated and economizing acid, which consists in subjecting iron or zinc to the action of acidulated water and adding to such water carbonate of soda and carbonate of ammonia for freeing it from floating or mingling particles of sulphate of iron or zinc.

4. In the generation of hydrogen by the action of dilute acid upon iron or zinc, the method of precipitating floating particles of sulphate of iron or zinc, which consists in adding to the dilute acid carbonate of soda or carbonate of ammonia, or both, whereby the dilute acid is rendered more active and can be used an increased period of time.

In testimony that I claim the foregoing as my own I affix my signature in presence of two witnesses.

BYRON SLOPER.

Witnesses:
O. E. DUFFY,
JOHN ENDERS, Jr.